(12) United States Patent
Rauch et al.

(10) Patent No.: US 9,936,708 B2
(45) Date of Patent: Apr. 10, 2018

(54) DEVICE FOR GENTLY PRODUCING A PASTRY STRAND

(75) Inventors: Eduard Rauch, St. Margareten (AT); Walter Martin, Graz (AT)

(73) Assignee: KOENIG MASCHINEN GESELLSCHAFT M.B.H., Graz (AT)

( * ) Notice: Subject to any disclaimer, the term of this patent is extended or adjusted under 35 U.S.C. 154(b) by 796 days.

(21) Appl. No.: 10/567,421

(22) PCT Filed: Jul. 1, 2004

(86) PCT No.: PCT/AT2004/000237
§ 371 (c)(1),
(2), (4) Date: Feb. 6, 2006

(87) PCT Pub. No.: WO2005/011386
PCT Pub. Date: Feb. 10, 2005

(65) Prior Publication Data
US 2006/0278094 A1    Dec. 14, 2006

(30) Foreign Application Priority Data
Aug. 4, 2003  (AT) ................. A 1229/2003

(51) Int. Cl.
  *A21B 7/00*  (2006.01)
  *A21C 3/04*  (2006.01)
  *A21C 3/00*  (2006.01)
(52) U.S. Cl.
  CPC . *A21C 3/04* (2013.01); *A21C 3/00* (2013.01)
(58) Field of Classification Search
  CPC ...................................... A21C 3/00

USPC ... 99/348, 450.1–450.8, 494, 516, 534, 357, 99/325–334, 352–355; 366/95; 83/703; 425/224–471
See application file for complete search history.

(56) References Cited

U.S. PATENT DOCUMENTS

| | | | |
|---|---|---|---|
| 4,453,906 A | | 6/1984 | Hayashi |
| 5,271,457 A | * | 12/1993 | Ganz ......................... 165/109.1 |
| 5,458,055 A | | 10/1995 | Fitch, Jr. |
| 5,657,685 A | * | 8/1997 | Garcia Torres ............. 99/450.4 |
| 6,283,327 B1 | * | 9/2001 | Rubtsov ......................... 222/56 |
| 2002/0075751 A1 | | 6/2002 | Ghanizadeh Khoub |
| 2003/0047085 A1 | * | 3/2003 | Rauch et al. ................ 99/450.1 |
| 2003/0099152 A1 | * | 5/2003 | Krader et al. ............. 366/162.5 |
| 2004/0025656 A1 | * | 2/2004 | Font et al. ....................... 83/56 |

FOREIGN PATENT DOCUMENTS

| | | |
|---|---|---|
| DE | 61479 C | 3/1892 |
| DE | 19621286 A1 | 11/1997 |
| DE | 19757311 A1 | 7/1999 |
| FR | 2591071 A1 | 6/1987 |
| JP | 52-66651 A | 6/1977 |
| JP | 11-004650 | 1/1999 |

* cited by examiner

*Primary Examiner* — Phuong Nguyen
(74) *Attorney, Agent, or Firm* — Kilpatrick Townsend & Stockton LLP

(57) ABSTRACT

The invention relates to a device for the dough-saving production of a dough strand (28) from a dough mass (6) found in a container (5), for which the container (5) has an outlet (27) at the bottom. The container (5) is made to rotate about its axis (7). The outlet (27) is edged by the container (5) and by a cutting disk (13) forming at least a part of the base of the container (5). The cutting disk (13) is also made to rotate in the same direction as the container (5).

21 Claims, 5 Drawing Sheets

DEVICE FOR GENTLY PRODUCING A PASTRY STRAND

BACKGROUND OF THE INVENTION

The invention relates to a device for the dough-saving production of a strip of dough from a dough mass found in a container made to rotate about its axis, the container having an outlet at the bottom for the dough mass. Furthermore, the invention relates to a method for the dough-saving production of dough strips.

Devices for continuous dough strand production are known in numerous embodiments. According to U.S. Pat. No. 5,888,573A, at least one pair of rollers is attached to the outlet of a dough hopper, the rollers of the roller pair performing a periodic movement toward one another or away from one another. Although a dough strip can be produced in this way, the dough is pressed periodically, which is undesirable, at least for sensitive types of dough. It is also known (EP 845 212 B) to divide an elongated dough mass into a plurality of dough portions which are then reconnected to form a continuous strip of dough. This construction has the disadvantages of a high structural expenditure and, due to the dough portions connected to one another, a bad quality of the dough strip.

Furthermore, devices are known from EP 30 481 A1 and FR 2 501 364 A1 in which the container is made to rotate about its axis.

SUMMARY OF THE INVENTION

An object of the present invention is to produce a continuous strip of dough in such a way that no pressure is exerted on the dough, except for its own weight, so that the dough is absolutely treated in a gentle manner and a deformation of the dough, perhaps due to an initial division and then reunification of dough portions, and the deterioration of the quality criteria of the dough associated therewith, are avoided. Moreover, the structural expenditure should be low. The invention solves this object in that the outlet is edged by the container and by a cutting disk forming at least a part of the base of the container, the cutting disk also being made to rotate in the same direction as the container. An outlet for the dough which is formed in this way retains its position, however, it is continuously edged by other peripheral sections of the container wall or of the cutting disk periphery due to the rotary movements of the container and the cutting disk. The outlet acts similar to a peeling process on the dough flowing out of the container and an absolute dough saving results since no pressure is exerted on the dough, except for the own weight of the dough. The dough is neither pushed or pressed nor deformed, so that structural measures required for such processes are omitted. A device of this type can be used for doughs with the most varied properties, i.e. both for white doughs and for mixed and rye doughs. The dough strand obtained can be used for further processing in the most varied ways, e.g. for the production of bread, small baked goods, baguettes or ciabattas. It is especially advantageous that the stress exerted on the dough is so slight that, in most cases, a prefermentation of the dough can be omitted, which means a substantial saving in time and production costs.

According to a preferred embodiment of the invention, the container and the cutting disk edge an essentially crescent-shaped outlet, a form that works similar to a pair of scissors and is especially advantageous for a dough-saving separation of the dough strand, similar to a peeling process, from the dough forming the starting material.

An especially advantageous embodiment of the invention lies in that the container has a circular opening at the bottom which is covered by a round cutting disk except for the outlet, wherein the cutting disk is as large as the opening of the container yet eccentric and axially parallel thereto. The structural and spatial requirement for this is low.

The device according to the invention is especially dough-saving when the container and the cutting disk turn at the same peripheral speed, since no friction whatsoever is exerted on the dough.

Changing the width of the dough strand obtained is easily possible within the scope of the invention in that the cutting disk is adjustable relative to the container for the purpose of changing the size of the outlet. By appropriate selection of size and/or form of the outlet, dough strands in the form of strips or very thin dough strips can also be produced.

With an appropriate construction, yields of about 0.2 to about 10 m/min can be obtained with the device of the invention.

The method according to the invention for the dough-saving production of a dough strand from a dough mass found in a container is based on a process in which the dough mass is allowed to flow downward out of the container made to rotate about its axis through an outlet. The method according to the invention is characterized in that the container and a cutting disk adjacent to it and edging the outlet can turn continuously in the same direction in such a way that the dough strand is continuously cut off from the dough mass in a shearing gap formed by the outlet. Advantageously, one proceeds in such a way that the container and the cutting disk can rotate at the same peripheral speed. A procedure of this type can be easily performed and monitored and results in an especially dough-saving treatment.

Further features and advantages of the invention can be found in the description of embodiments of the device according to the invention which are schematically illustrated in the drawings.

DESCRIPTION OF THE PREFERRED EMBODIMENTS

Figure 1:
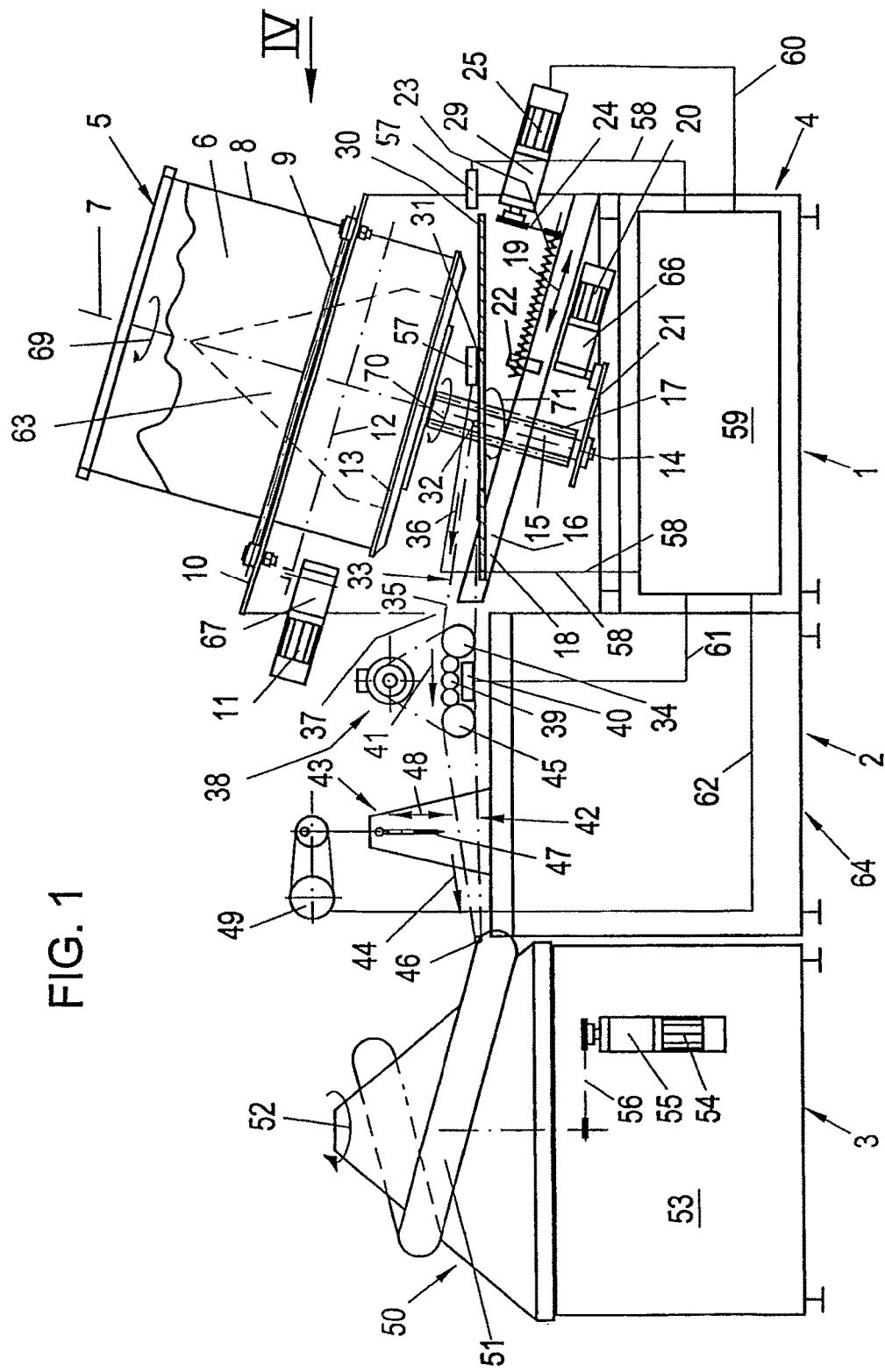
FIG. 1 shows a first embodiment of the device, partially in a vertical section, with a closed outlet, i.e. during the initial filling of the container.
Figure 2:
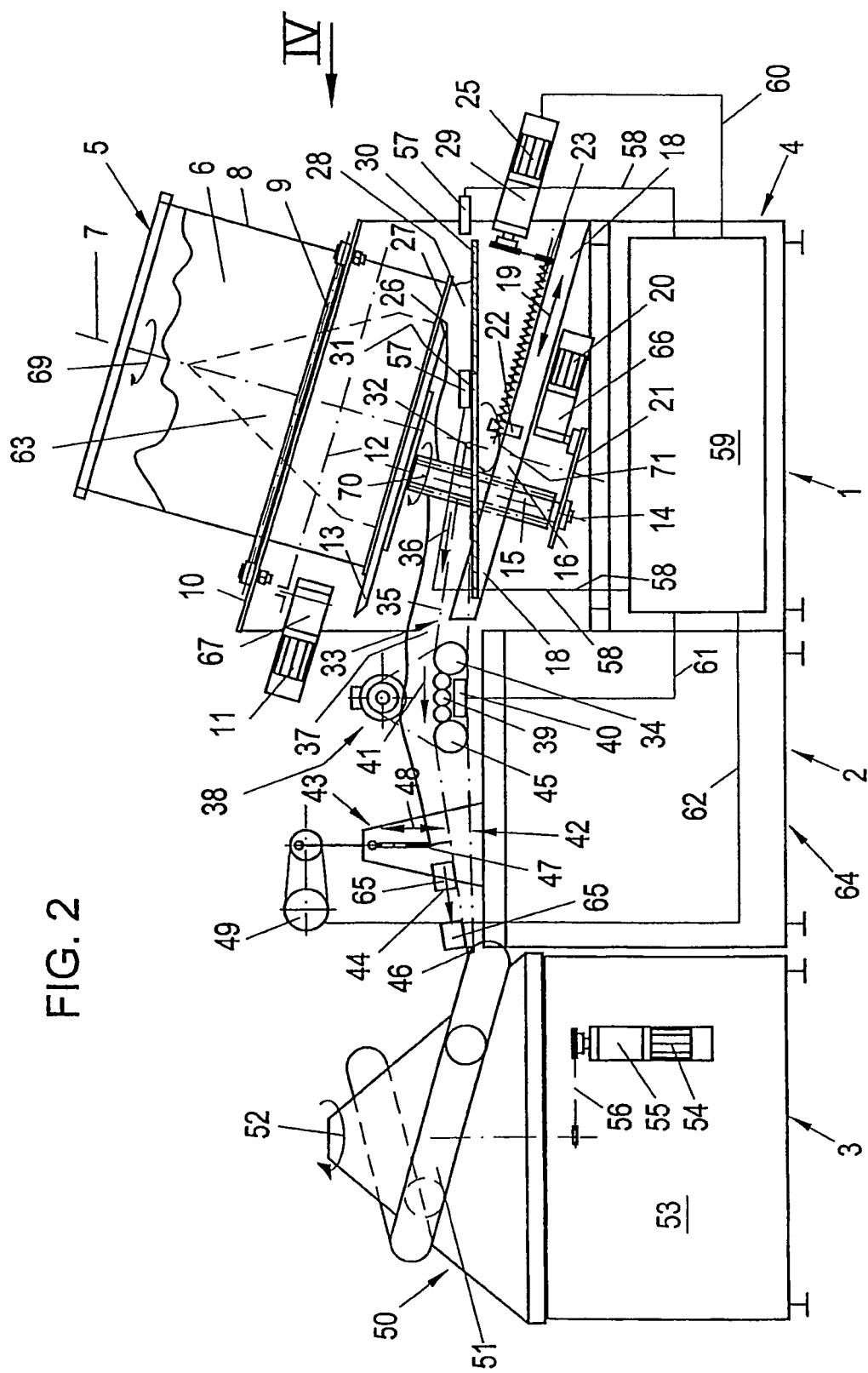
FIG. 2 shows the same device during operation, i.e. with an open outlet.

The device according to FIGS. 1 and 2 has essentially three sections: In the first section 1, the dough strand is produced, and in the second section 2, the dough strand obtained is divided into portions of predetermined weight which are processed further in the third section 3, e.g. kneaded into a round shape. The first section 2 has a frame 4 in which a container 5 for the dough 6 to be processed is provided. The container 5 is circular cylindrical in shape, however, it does not have its own curvature. It is pivoted about its inclined axis 7 in the frame 4. For this purpose, the container 5 has a bearing flange 9 on its casing 8 with which it is supported on the diagonally situated cover wall 10 of the frame 4. The rotary movement of the container 5 in the direction of arrow 69 is actuated by a motor 11 with gearing 67 fastened to the frame 4, whose output drive shaft interacts in a movably locked manner with a gear rim 12 fastened to the casing 8 of the container 5.

A base plate configured as a cutting disk 13 abuts the lower end of the casing 8 of the container 5, the base plate preferably being circular and about as large as the lower opening of the container casing 8. This cutting disk 13 is movable relative to the container 5 normal to the direction of the axis 7 so as to be adjustable, its plane standing normal on the axis 7. The cutting disk 13 is also made to rotate in the direction of the arrow 70 about its central axis 14. To this end, the cutting disk 13 carries a shaft 15 whose bearing 17 is carried by a sliding carriage 16 which can be moved back and forth in a diagonally situated guide 18 of the frame 4 in the direction of the double arrow 19. The rotary motion of the cutting disk 13 is evenly directed and takes place at almost the same peripheral speed (±15%) as that of the container 5. The actuation takes place by a motor 20 with gearing, supported by the sliding carriage 16, via a chain drive 21.

The sliding carriage 16 supports a threaded block 22, the thread of which sits on a spindle 23 whose other end is fastened to the guide 18 so as to be rotatable but not longitudinally movable. The spindle 23 can be turned in any manner desired, e.g. by means of a chain drive 24, by a motor 25 with gearing 29 fastened to the frame, as a result of which the sliding carriage 16 and with it the shaft 15 carried by it together with the cutting disk 13 thereon are movable and adjustable relative to the container 5 in the direction of the double arrow 19.

Figure 3:
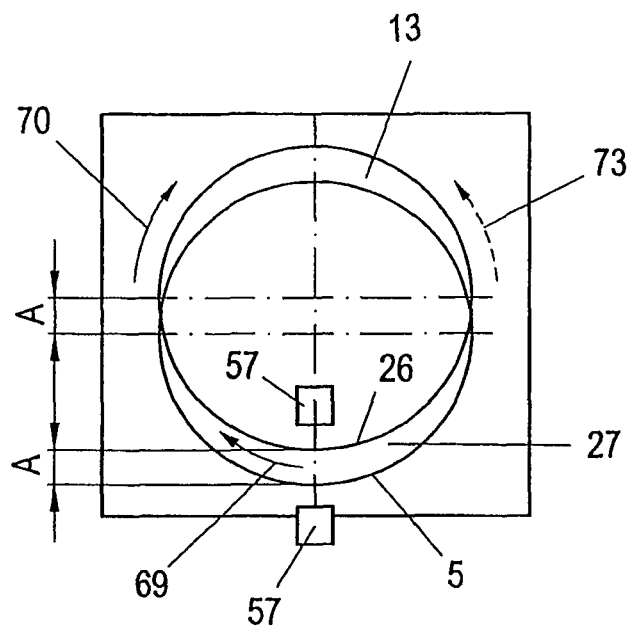
FIG. 3 schematically shows the crescent shape of the outlet edged by the container opening and the cutting disk.
Figure 4:
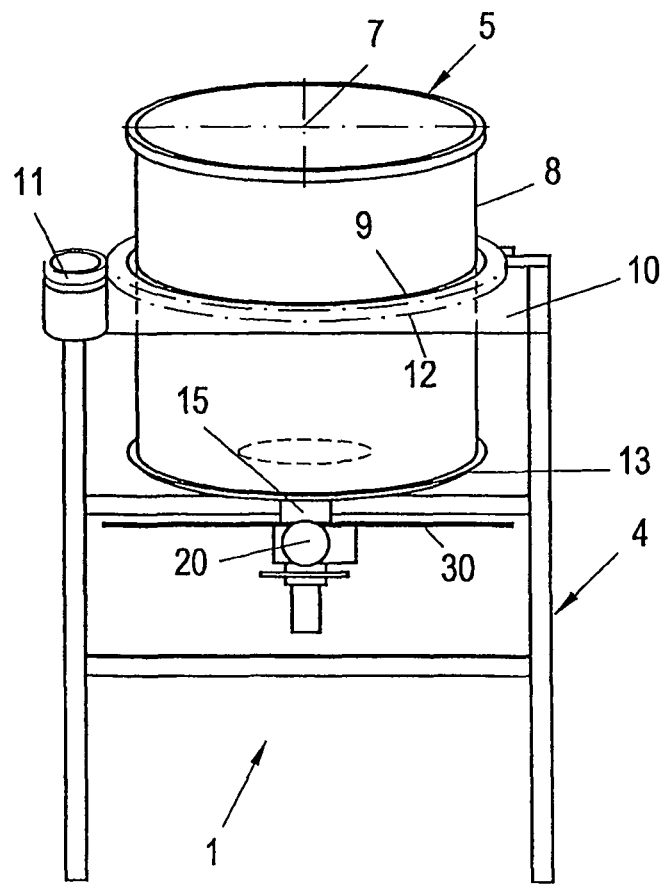
FIG. 4 is a side view of the device in the direction of arrow IV of FIG. 1 or 2, whereby individual details are omitted for a better overview.

In the starting position shown in FIG. 1, the cutting disk 13 completely closes the lower opening of the container 5. This position corresponds to the initial position in which the container 5 is filled with dough 6. By shifting the cutting disk 13 relative to the container 5 by means of the motor 25, the cutting disk can be brought into the working position shown in FIG. 2 in which its periphery 26 together with the periphery of the container casing 8 form a crescent-shaped outlet 27 for the dough 6 found in the container 5. As a result of the synchronous rotations of the container 5 and the cutting disk 13, this outlet 27 is continually edged by other peripheral sections of the container 5 or cutting disk 13, however, it always retains its position. By shifting the cutting disk 13 relative to the container 5, the size of the outlet 27 can be adjusted in order to be able to adapt to the desired width of the dough strand to be produced or to different dough qualities. As can be seen in FIG. 3, the crescent-shaped outlet 27 is widest in the center, this width diminishing toward both ends up to the zero value. The sections of the container and cutting disk 13 edging the outlet 27 act as scissors which continuously peel a dough strand 28 off from the dough 6 to be processed, the dough strand flowing out through the outlet 27. Its width corresponds essentially to the largest width A of the outlet 27 (FIG. 3). With an advantageously equal diameter of the lower container edge 5 and the cutting disk 13, this width A is equal to the eccentricity with which, in the operation position shown in FIG. 2, the axis 14 of the cutting disk 13 is situated eccentrically and axially parallel relative to the container axis 7. As can be seen, this dough strip width A can be changed by adjusting the cutting disk 13.

The dough strand 28 flowing out of the outlet 27 is received by a transfer unit arranged below the container 5 and transported away. This transfer unit can be a conveyor belt, however, advantageously, the transfer unit is configured as a transfer disk 30 which is arranged horizontally and made to rotate about its central axis in the direction of the arrow 71 by a drive (not shown). The transfer disk 30 has a central opening 31 which is passed through by the shaft 15 and its bearing 17 with such a large clearance that the aforementioned shift of the cutting disk 13 is possible to the maximum extent in all rotational positions of the transfer disk 30. Due to the rotary movement of the transfer disk 30, the dough strand 28 flowing out of the outlet 27 is conveyed laterally about the shaft 15 to the pick-up edge 32 of a transfer unit 33 which is configured as a crawler belt 35 guided about the pick-up edge 32 and a guide pulley 34 and which is made to rotate by the guide pulley 34 in the direction of the arrow 36. The transfer unit 33 conveys the dough strand 28 received at the pick-up edge 32 through an opening 37 out of the frame 4 of the system section 1 and transfers it to a weighing device 38 which is located on the frame 64 of the system section 2. This weighing device 38 may have any design desired, e.g. be configured with weighing rollers 39 under which a weighing sensor 40 is placed. Design and function of such a weighing device 38 are known and therefore do not require a more detailed description. The weighing device 38 scans the weight of the dough strand 28 running in the direction of arrow 41 and transfers the dough strand to a conveyor belt 42 which runs along below a dough dividing mechanism 43 in the direction of arrow 44 and is guided over a guide pulley 45 and a delivery edge 46. The drive takes place via the guide pulley 45. The dough dividing mechanism 43 has a blade configured like a guillotine which is actuated in the direction of the double arrow 48 by a drive 49. At the delivery edge 46, the conveyor belt 42 transfers the cut dough portions 65 to the third system section 3 configured as a round-kneading device 50. This round-kneading device 50 may have any design desired. It is configured as a tapered kneader 51 in the embodiment shown, the cone of which is made to rotate in the direction of the arrow 52 by a motor 54 with gearing 55 arranged in the frame 53 via a chain drive 56.

The width of the dough strand 28 measured in a horizontal direction approximately in a radial direction of the container 5 is predominantly determined by the maximum width A of the gap forming the outlet 27 (FIG. 3) between the cutting disk 13 and container 5. To be able to adjust or correct this dough strand width to a preset measurement, two sensors 57 arranged at a distance from one another are placed above the transfer disk 30, the sensors situated on both sides of the dough strand flowing out of the outlet 27 and responding to their width measured in the noted direction. When the level of the dough 6 in the container 5 changes, then the pressure on the dough which causes the dough 6 to flow out through the outlet 27 also changes. This change is scanned by the sensors 57 and these sensors 57 cause a change of the position of the cutting disk 13 determining the size of the outlet 27. For this purpose, the sensors 57 are attached via lines 58 to a control circuit 59 in the frame 4 which effects the control of the motor 25 required for the change in the outlet 27 via a line 60.

The control circuit 59 can also be used to control the dough dividing mechanism 43. For this purpose, the signal of the weighing device 38 delivered by the weighing sensor is applied via a line 61 to the control circuit 59 which controls the drive 49 of the blade 47 via a line 62. To obtain dough portions 65 of equal weight which are conveyed to the round-kneading device 50, the control circuit 59 operates as follows: The dough strand width is monitored and kept constant via the sensors 57. Maintaining a desired weight of the dough portion is therefore easily possible in that a dough strand length of this type is conveyed through at the dough dividing mechanism 43 until the desired weight of the dough portion is obtained, after which it is cut off. The longitudinal measuring, which corresponds to the predetermined dough portion weight, is performed via the weighing device 38, and the corresponding control supplies the control circuit 59.

Advantageously, a guide element, in particular a cone 63, is arranged in the container 5 which forms a dough ring from the dough batch poured into the container, the dough ring then flowing through the scissors formed by the outlet 27.

Figure 5:
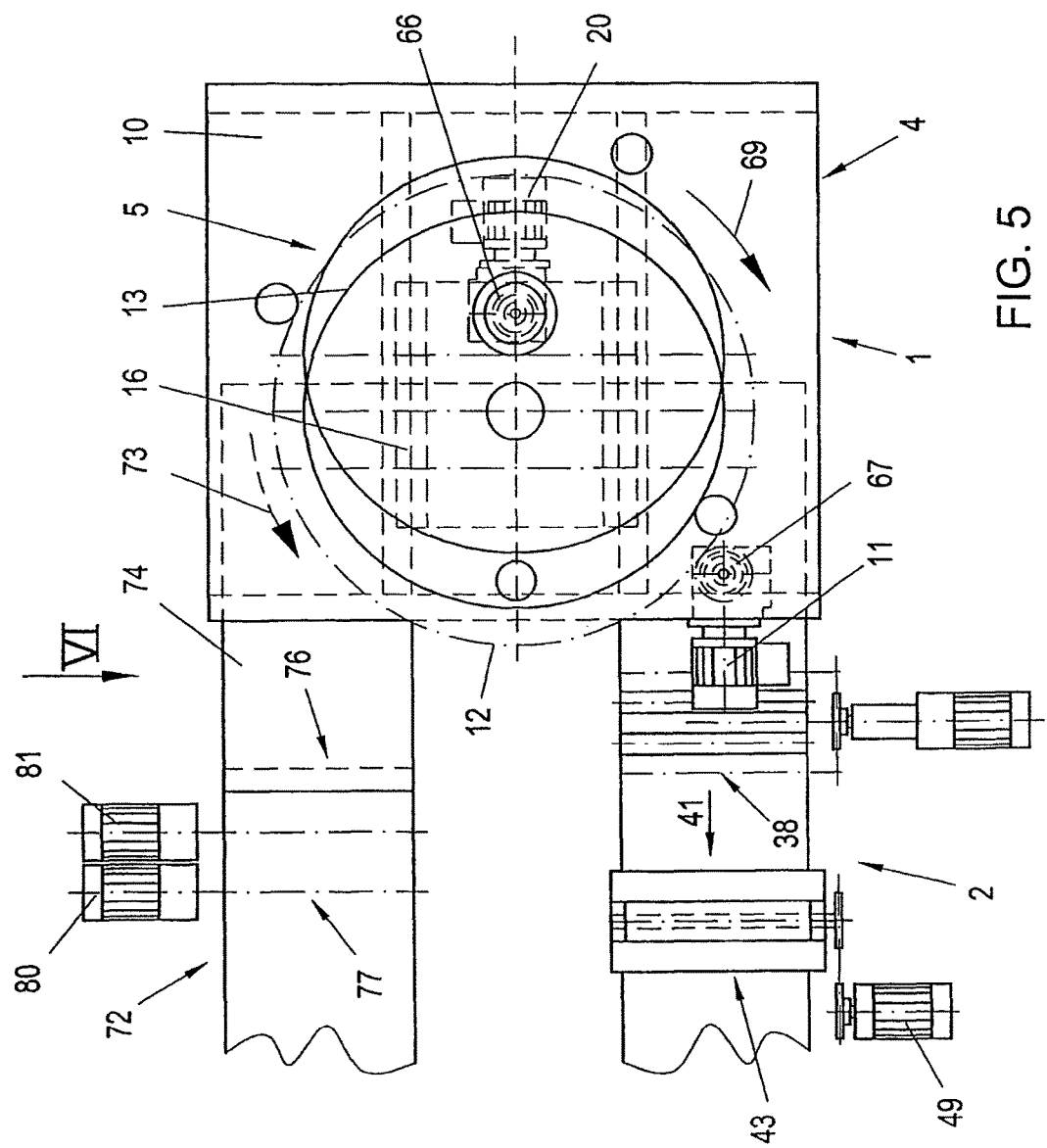
FIG. 5 is a top view onto a second embodiment of the device.
Figure 6:
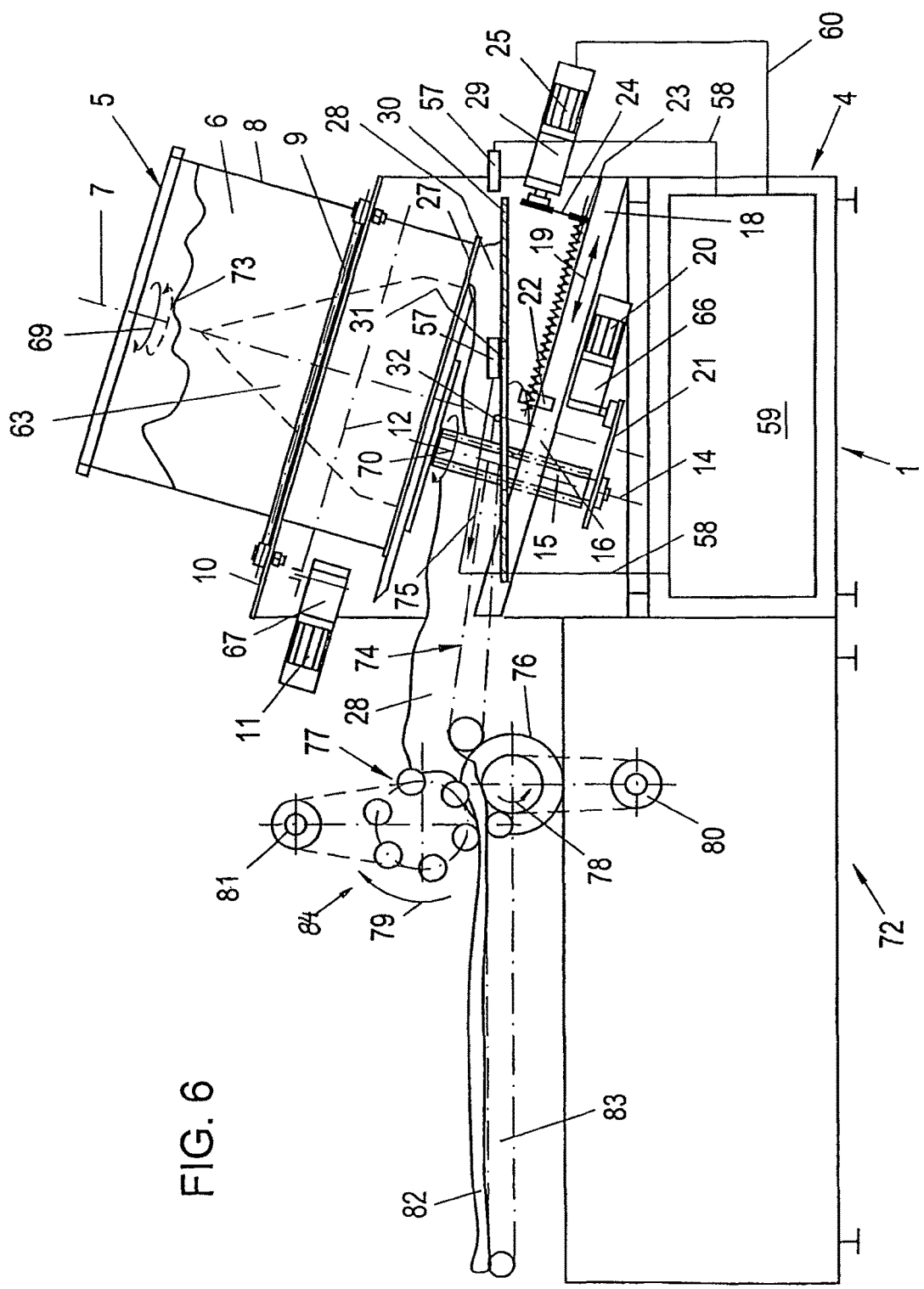
FIG. 6 is a side view in the direction of the arrow VI of FIG. 5.

The embodiment shown in FIGS. 5 and 6 has, in addition to the system section 2, a further system section 72 for the further processing of the dough strand received by the transfer disk 30 from the outlet 27, the two sections 2, 72 being arranged on both sides of the axis 7 of the container 5 and, seen in the conveying direction of the dough, lying advantageously parallel to one another. The dough strand is optionally conveyed either to section 2 or section 72. To obtain this, the directions of rotation of the container 5, the cutting disk 13 and the transfer disk 30 may be reversed, so that e.g. the container 5 can be driven not only in the direction of the arrow 69 (FIG. 5), but also in the direction of the arrow 73 (shown by a broken line). If the container 5 is allowed to rotate in the direction of arrow 69 and the directions of rotation of the cutting disk 13 and transfer disk 30 are also selected in the same direction, then the dough strand flowing out through the outlet 27, as was described in connection with FIGS. 1 to 4, is conveyed by the transfer disk 30 to the crawler belt 35 and from there via the weighing device 38 to the dough dividing mechanism 43. This mode of operation is suitable for the production of large breads of all types of dough, and the round-kneading device 50 can optionally also be omitted.

If, on the other hand, the container 5 is turned in the direction of arrow 73, i.e. counterclockwise (seen in FIG. 5), and if the drive of the cutting disk 13 and the transfer disk 30 also takes place in the same direction, then the dough strand flowing out of the outlet 37 onto the transfer disk 30 goes from there to a further crawler belt 74 (FIGS. 5, 6) which conveys the dough strand 38 in the direction of arrow 75 to a calibrating roll 76 which is opposite a satellite roll arrangement 77 and forms a dough strip forming device 84 together with it. The calibrating roll 76 or the satellite roll arrangement 77 are made to rotate in the direction of the arrows 78 or 79 by motors 80 or 81. The dough flows out of the gap formed by the satellite roll arrangement 77 and the calibrating roll 76 in a diluted form, i.e. as a dough strip 82, and is conveyed by a conveyor belt 83 for further processing, optionally to a round-kneading device. This further processing of the dough obtained through the outlet 27 is especially suitable for producing small baked goods, e.g. ciabattas, baguettes or rolls.

The inclined position of the container 5 shown is not imperative. The container 5 can also be arranged with a vertical axis 7. More inclined positions up to an almost horizontal position of the axis 7 are also possible.

The container 5 can be filled continuously or in batches. It is not necessary to pre-portion the dough quantities 6 to be processed.

The invention claimed is:

1. A device for the dough-saving production of a dough strand from a dough mass found in a container made to rotate about its axis, for which the container has an outlet at the bottom, the outlet being edged by the container and by a circular cutting disk and being crescent-shaped in cross-section, and the cutting disk forming at least a part of the base of the container and also being made to rotate in the same direction as the container, wherein the container and the cutting disk edge an outlet which is crescent-shaped in cross-section, wherein the container has a circular opening at the bottom which is covered by the circular cutting disk except for the outlet, and wherein the cutting disk is approximately as large as the opening of the container and is eccentric and axially parallel thereto.

2. The device according to claim 1, characterized in that the container and the cutting disk rotate at approximately the same peripheral speed.

3. The device according to claim 1, characterized in that the cutting disk is arranged normally to the container axis.

4. The device according to claim 1, characterized in that the cutting disk is adjustable relative to the container for the purpose of changing the size of the outlet.

5. The device according to claim 1, characterized in that a transfer unit for the removal of the dough strand is arranged under the outlet.

6. The device according to claim 5, characterized in that the transfer unit is formed by a transfer disk made to rotate, which has an opening in the center that is passed through by a shaft for the rotational movement of the cutting disk, preferably with sufficient clearance for the adjustment of the cutting disk.

7. The device according to claim 5, characterized in that dough sensors are situated above the transfer unit on both sides of the outlet, said sensors being connected with a control circuit for adjusting the cutting disk.

8. The device according to claim 1, characterized in that, seen in direction of movement of the dough strand, a weighing device, e.g. weighing rolls, follows the outlet or the transfer unit, which controls a dough dividing mechanism.

9. The device according to claim 8, characterized in that a transfer unit, in particular a crawler belt, is arranged between the transfer unit and the weighing device or dough strip forming device.

10. The device according to claim 8, characterized in that a round-kneading device or a long-kneading device is attached to the dough dividing device.

11. The device according to claim 1, characterized in that, seen in the direction of movement of the dough strand, a dough strip forming device, e.g. formed by satellite rolls, follows the outlet or the transfer unit.

12. The device according to claim 1, characterized in that the directions of rotation of the container and the cutting disk can be reversed and different dough processing devices follow the transfer unit on both sides of the container axis.

13. The device according to claim 1, characterized in that a guide element, in particular a cone, is arranged in the container so that the dough in the container is guided to the outlet.

14. The device according to claim 1, characterized in that the axis of the container and the axis about which the cutting disk turns are inclined to the horizontal plane.

15. The method according to claim 1, characterized in that the dough strand flowing out downward from the outlet is picked up by a continuously moving transfer unit and conveyed for further processing.

16. A device for the dough-saving production of a dough strand from a dough mass found in a container made to rotate about its axis, for which the container has an outlet at the bottom, the outlet being edged by the container and by a circular cutting disk forming at least a part of the base of the container and also being made to rotate in the same direction as the container, wherein the container and the cutting disk edge an outlet which is crescent-shaped in cross-section, wherein the container has a circular opening at the bottom which is covered by the circular cutting disk except for the outlet, and wherein the cutting disk is approximately as large as the opening of the container and is eccentric and axially parallel thereto.

17. A device for the dough-saving production of a dough strand from a dough mass found in a container made to rotate about its axis, for which the container has an outlet at the bottom, the outlet being edged by the container and by a cutting disk forming at least a part of the base of the container, said cutting disk also being made to rotate in the same direction as the container and being adjustable relative to the container for the purpose of changing the size of the outlet.

18. A device for the dough-saving production of a dough strand from a dough mass found in a container made to rotate about its axis, for which the container has an outlet at the bottom, the outlet being edged by the container and by a cutting disk forming at least a part of the base of the container, said cutting disk also being made to rotate in the same direction as the container, and a transfer unit for the removal of the dough strand arranged under the outlet, the transfer unit being formed by a transfer disk made to rotate, which has an opening in the center that is passed through by a shaft for the rotational movement of the cutting disk with sufficient clearance for the adjustment of the cutting disk.

19. A device for the dough-saving production of a dough strand from a dough mass found in a container made to rotate about its axis, for which the container has an outlet at the bottom, the outlet being edged by the container and by a cutting disk forming at least a part of the base of the container, said cutting disk also being made to rotate in the same direction as the container, a transfer unit for the removal of the dough strand arranged under the outlet, the transfer unit being formed by a transfer disk made to rotate, which has an opening in the center that is passed through by a shaft for the rotational movement of the cutting disk with sufficient clearance for the adjustment of the cutting disk, and dough sensors situated above the transfer unit on both sides of the outlet, said sensors being connected with a control circuit for adjusting the cutting disk.

20. A device for the dough-saving production of a dough strand from a dough mass found in a container made to rotate about its axis, for which the container has an outlet at the bottom, the outlet being edged by the container and by a cutting disk forming at least a part of the base of the container, said cutting disk also being made to rotate in the same direction as the container, and wherein, seen in the direction of movement of the dough strand, a weighing device including weighing rolls follows the outlet or the transfer unit, which controls a dough dividing mechanism.

21. A device for the dough-saving production of a dough strand from a dough mass found in a container made to rotate about its axis, for which the container has an outlet at the bottom, the outlet being edged by the container and by a cutting disk forming at least a part of the base of the container, said cutting disk also being made to rotate in the same direction as the container, and wherein the directions of rotation of the container and the cutting disk can be reversed and different dough processing devices follow the transfer unit on both sides of the container axis.

* * * * *